Oct. 6, 1936.  O. DAHL  2,056,772

FISHING NET

Filed Feb. 2, 1934

INVENTOR:
OSCAR DAHL
BY: Francis E Boyce
ATTORNEY

Patented Oct. 6, 1936

2,056,772

UNITED STATES PATENT OFFICE 2,056,772

FISHING NET

Oscar Dahl, La Rochelle, France

Application February 2, 1934, Serial No. 709,422
In France February 17, 1933

3 Claims. (Cl. 43—9)

It frequently happens that the rear end of the rear pocket of a fishing net, when made heavy by detritus such as stones, sea-weed, sand, etc., which collect in this part of the net, and also by large flat fish, crabs, etc., will rub upon the sea bottom and thus becomes worn or torn upon the ground. The fish then escape through the torn part, and the whole product of the fishing is lost. On the other hand, the fish which are in contact with the detritus in the net are very often damaged by the latter.

The present invention has for its object to devise a fishing net which does not offer these drawbacks. For this purpose, the net according to the invention comprises two or more rear pockets which are superposed and independent from each other.

Owing to this construction, the fish collected by the upper rear pocket are no longer in contact with the lower rear pocket containing the detritus (stones, coral, shell-fish, etc.) and incur no risk of being crushed.

Furthermore, with separate and superposed rear pockets, it is possible to make such pockets much shorter for a given total capacity, thus greatly reducing the compression of the fish. The load of one of the rear pockets is without any action upon the load of the other pocket, owing to the complete separation of these pockets.

Due to this arrangement, not only will the fish be less damaged, but the net will also be much more easily handled when being hauled on board.

Moreover, owing to the complete separation of the rear pockets, the inspection of their entire surface and the repairs are greatly facilitated.

Further advantages will be set forth in the following description.

In the accompanying drawing, which is given solely by way of example:

Figure 1:
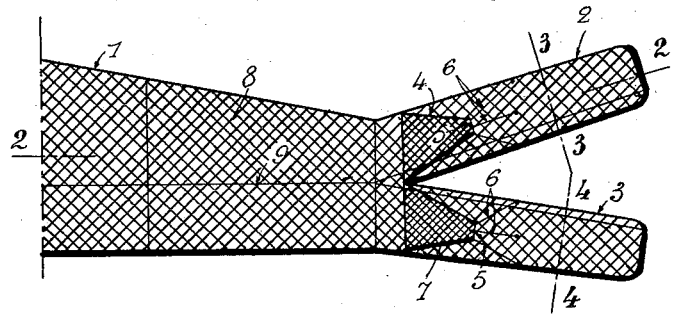
Fig. 1 is a partial vertical section on the line 1—1 of Fig. 2, of a net with an upper and a lower rear pocket.
Figure 2:
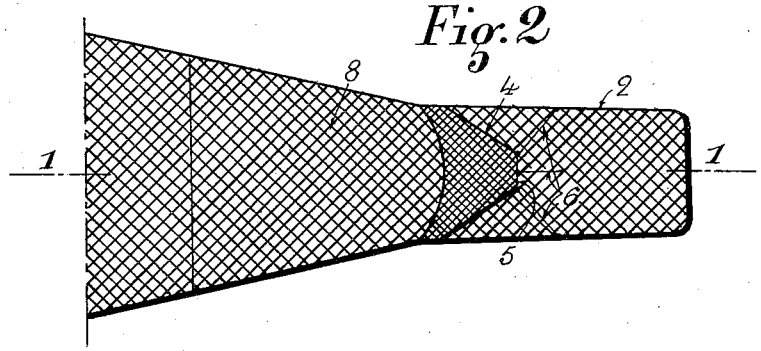
Fig. 2 is a horizontal section on the line 2—2 of Fig. 1.
Figure 3:
Figure 4:

Figs. 3 and 4 are cross-sections on the lines 3—3 and 4—4 of Fig. 1.

In the embodiment herein represented, the net 1 comprises two superposed and separate rear pockets 2 and 3. The mouth of the upper pocket 2 is provided with a screen or funnel 5. This screen, which has a conical or other shape, ends in the rear in an opening 5, through which the fish enter pocket 2. Screen 4 is held in proper shape by means of stretched ropes 6.

In like manner, the lower rear pocket 3 is provided with a similar screen 7.

The body 8 of the net is constructed in any suitable manner. 9 denotes the side rope forming the seam between the upper and lower sheets.

During the fishing operation, most of the fish will proceed through the upper opening 5 into the upper pocket 2. Experience shows that about nine-tenths of the fish which are caught will collect in the upper pocket 2, whilst the lower pocket 3 collects all the heavy fish (shell-fish) and heavy substances such as stones, coral, etc.

Experience further shows that the round or swimming fish have a tendency to enter the upper pocket 2 only. As this pocket is entirely separate, and free to swell or bulge out, many of the small immature fish will have an opportunity to escape through the open meshes, whereas in an ordinary rear pocket, whose meshes are almost entirely closed, the small fish are crushed by their contact with the collected detritus.

Obviously, if for any reason the lower part of the pocket 3 should be torn, the few fish contained in this pocket will risk escaping, but in any case the greater part of the fish contained in the rear pocket 2 will be held within the net.

The invention is not strictly limited to the embodiment represented and described, which has been chosen only by way of example. Obviously, the number of superposed rear pockets such as 2 and 3 may be as desired, as well as the shape of the screens or funnels 4 and 7. The invention may be applied to nets of all classes.

Having now described my invention what I claim as new and desire to secure by Letters Patent is:

1. In a trawl net, a main body, and an upper and a lower rear pocket, a gap extending between the lower wall of the upper pocket and the upper wall of the lower pocket from the rear end thereof throughout substantially the entire length of said pockets.

2. In a trawl net, a main body, and superposed rear pockets opening into said body, said rear pockets having no common wall to the rear of the line of joinder and throughout substantially their entire length.

3. In a trawl net, a main body, an upper swimming fish-collecting rear pocket and a lower detritus-collecting pocket, said rear pockets opening into said main body and being in superposed relation and independent of each other except along the line of joinder with said main body.

OSCAR DAHL.